United States Patent
Heiss

(10) Patent No.: US 9,703,535 B2
(45) Date of Patent: *Jul. 11, 2017

(54) SYSTEM AND METHOD FOR SOFTWARE DEVELOPMENT USING GRAPHICAL TREE STRUCTURES

(71) Applicant: Kirsten Ingmar Heiss, Munich (DE)

(72) Inventor: Kirsten Ingmar Heiss, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,115

(22) Filed: Nov. 14, 2016

(65) Prior Publication Data
US 2017/0060544 A1   Mar. 2, 2017

Related U.S. Application Data

(63) Continuation of application No. 14/962,598, filed on Dec. 8, 2015, now Pat. No. 9,524,150.

(60) Provisional application No. 62/091,852, filed on Dec. 15, 2014.

(51) Int. Cl.
*G06F 9/44* (2006.01)
*G06F 17/30* (2006.01)

(52) U.S. Cl.
CPC .............. *G06F 8/35* (2013.01); *G06F 8/30* (2013.01); *G06F 8/34* (2013.01); *G06F 17/30292* (2013.01); *G06F 17/30327* (2013.01)

(58) Field of Classification Search
CPC ..................... G06F 8/30; G06F 8/34
USPC ....................... 717/106, 107, 109
See application file for complete search history.

(56) References Cited

U.S. PATENT DOCUMENTS

| | | | |
|---|---|---|---|
| 5,608,898 A | 3/1997 | Turpin et al. | |
| 6,182,273 B1 | 1/2001 | Tarumi | |
| 6,212,672 B1 | 4/2001 | Keller et al. | |
| 6,959,429 B1 * | 10/2005 | Hatcher | G06F 17/30 707/999.104 |
| 8,365,200 B1 | 1/2013 | Thimmel et al. | |
| 8,706,776 B1 | 4/2014 | Kraft et al. | |
| 2003/0110472 A1 * | 6/2003 | Alloing | G06F 8/71 717/122 |
| 2005/0108681 A1 | 5/2005 | Bent et al. | |

(Continued)

OTHER PUBLICATIONS

Lam, Patrick; "The Hob System for Verifying Software Design Properties"; Feb. 2007.

*Primary Examiner* — Phillip H Nguyen
(74) *Attorney, Agent, or Firm* — Lewis Roca Rothgerber Christie LLP

(57) ABSTRACT

A method for building a software application includes: creating data fields based on input from a user, each having a value or a reference to another data field; grouping the data fields into node data structures, each having a node state for specifying allowable operations; assigning respective node data structures to a plurality of container data structures, respectively, where each container data structure stores information about conditions, actions, actions results, and permission settings to operate on one or more data fields. The method further includes creating tree data structures by linking the container data structures in a predetermined hierarchical manner, where each tree data structure includes information about relations of container data structures and node data structures in each tree data structure; and linking the tree data structures in an ordered sequence to create a computer executable process for performing an application.

18 Claims, 16 Drawing Sheets

(56) References Cited

U.S. PATENT DOCUMENTS

2008/0005061 A1    1/2008  Kraft et al.
2008/0282035 A1*  11/2008  Hundt ................. G06F 12/0802
                                                          711/128
2011/0264754 A1*  10/2011  Gidugu .................... G06F 8/36
                                                          709/206

* cited by examiner

FIG. 4

| Tree | Form(s) assigned | Condition | Action |
|---|---|---|---|
| 402 | | | |
| 404 | | Condition 1: Return value of container 200 is „Refused". Condition 2: Return value of container 230 is „Accepted". | Send email to applying user about refusal if condition 1 is true. Send email to applying user about acceptance if condition 2 is true. |
| 406 | Job application form | Condition 1: all child containers return the value „Required documents submitted". | Create form „Preselection". Return value „Application complete" if condition 1 is true. |
| 408 | Letter of recommendation | Condition 1: the number of submitted forms > 0. Condition 2: the field „Email of Referee" is filled in. | Send email to applying user and central coordinator if condition 1 is true. Create form „Letter of recommendation" if condition 2 is true. Send email to referee if condition 2 is true. Return value „Required documents submitted" if condition 2 is true. |
| 410 | | Condition 1: any child container returns the value „Refused". Condition 2: Return value of container 230 is „Accepted". Condition 3: the number of submitted forms > 0. | Send email to applicant and referee if condition 3 is true. Return value „Required documents submitted" if condition 2 is or condition 3 are true. Return value „Required documents missing" if condition 3 is true. |
| 412 | Preselection form | Condition 1: field „Next Round" in submitted form is „Yes". Condition 2: field „Next Round" in submitted form is „No". | Return value „Refused" if condition 1 is true. Return value „Accepted" if condition 2 is true. |
| 414 | Evaluation form | Condition 1: mean of fields „Score" of all submitted forms ≥ 5. Condition 2: mean of fields „Score" of all submitted forms < 5. | Create 2 forms of the type „Evaluation" if condition 1 is true. Return value „Refused" if condition 2 is true. |
| 416 | Final decision form | Condition 1: field „Final decision" in a submitted form is „No". Condition 2: field „Final decision" in a submitted form is „Yes". | Create form „Final decision" if condition 1 is true. Return value „Refused" if condition 2 is true. Return value „Refused" if condition 1 is true. Return value „Accepted" if condition 2 is true. |

FIG. 5

| Tree | | Form(s) assigned | Condition | Action |
|---|---|---|---|---|
| 502 | | Transcript of recrods | Condition 1: Any child container in any level shows result value "finally failed" Condition 2: All first level child containers return the value "passed" | Create PDF "Letter of exmatriculation" if condition 1 is true Create PDF "Transcript of letter" if condition 2 is true |
| | 504 | Certificate | Condition 1: the return value of all first level child containers is "passed" | If condition 1 is true: Return value "passed" Create form "certificate" Sum up values of field "credits" in all submitted nodes and fill into "certificate" form Add value of field "grade" in submitted, passed node from 508 |
| | 506 | Seminar Astrophysics | Condition 1: the field „quality" in a submitted form is "passed" | Return value "passed" if condition 1 is true |
| | 508 | Exam Astrophysics | Condition 1: the field „quality" in a submitted form in this level or below is "passed" Condition 2: the number of submitted nodes with field "quality" = "failed" ≥ 3 | Return value "passed" if condition 1 is true Return value "finally failed" is condition 2 is true |
| | 510 | Exam Astrophysics 2009 | | |
| 512 | | Module Certificate | | |
| | 514 | Certificate | Condition 1: the return value of any first level child container is "passed" | If condition 1 is true: Return value "passed" Create form "certificate" Sum up values of field |

|  |  |  | "credits" in all submitted nodes and fill into "certificate" form<br>Add value of field "grade" in submitted, passed node from 518 |
|---|---|---|---|
| 516 | Seminar Math I | Condition 1: the field „quality" in a submitted form is "passed" | Return value "passed" if condition 1 is true |
| 518 | Exam Math I | Condition 1: the field „quality" in a submitted form is "passed"<br>Condition 2: the number of submitted nodes with field "quality" = "failed" ≥ 3 | Return value "passed" if condition 1 is true<br>Return value "finally failed" is condition 2 is true |
| 520 | Certificate | Condition 1: the field „quality" in a submitted form is "passed" | If condition 1 is true:<br>Return value "passed"<br>Create form "certificate"<br>Sum up values of field "credits" in all submitted nodes and fill into "certificate" form<br>Add value of field "grade" in submitted, passed node from 522 |
| 522 | Exam Physics I | Condition 1: the field „quality" in a submitted form is "passed"<br>Condition 2: the number of submitted nodes with field "quality" = "failed" ≥ 3 | Return value "passed" if condition 1 is true<br>Return value "finally failed" is condition 2 is true |

| Tree | Form(s) assigned | Condition | Action |
|---|---|---|---|
| 602 | | Condition 1: sum of fields "amount" in all forms with fields status = "paid" in all child containers ≥ 2000 | Return value "volume exceeded" if condition is true |
| 604 | Travel Grant | Condition 1: sum of fields "amount" of all forms with field "status" = "paid" inside the container ≥ 1000<br>Condition 2: number of forms with field "status" = "paid" ≥ 3<br>Condition 3: number of forms with field "status" = "pending" > 0 | Return value "volume exceeded" if condition 1 OR condition 2 is true<br>Return value "Grant applicaiton pending" if condition 3 is true<br>Create 2 forms "Science Department Varification" in 2.1.1 with form ID from 1.1.1 |
| 606 | Lecturing Grant | Condition 1: sum of fields "amount" of all forms with field "status" = "paid" inside the container ≥ 1500<br>Condition 2: number of forms with field "status" = "paid" ≥ 3<br>Condition 3: number of forms with field "status" = "pending" > 0 | Return value "volume exceeded" if condition 1 OR condition 2 is true<br>Return value "Grant applicaiton pending" if condition 3 is true<br>Create 2 forms "Science Department Varification" in 2.1.1 with form ID from 1.1.2 |
| 608 | Verification | Condition 1: Container 2.2 returns value "Paid"<br>Condition 2: Container 2.1 return value "Refused" | Update field "status" to value "paid" in referenced form in 1.1.1 resp. 1.1.2 |
| 610 | Formal Verification | Condition 1: All child containers return value "approved"<br>Condition 2: Any child container returns | |

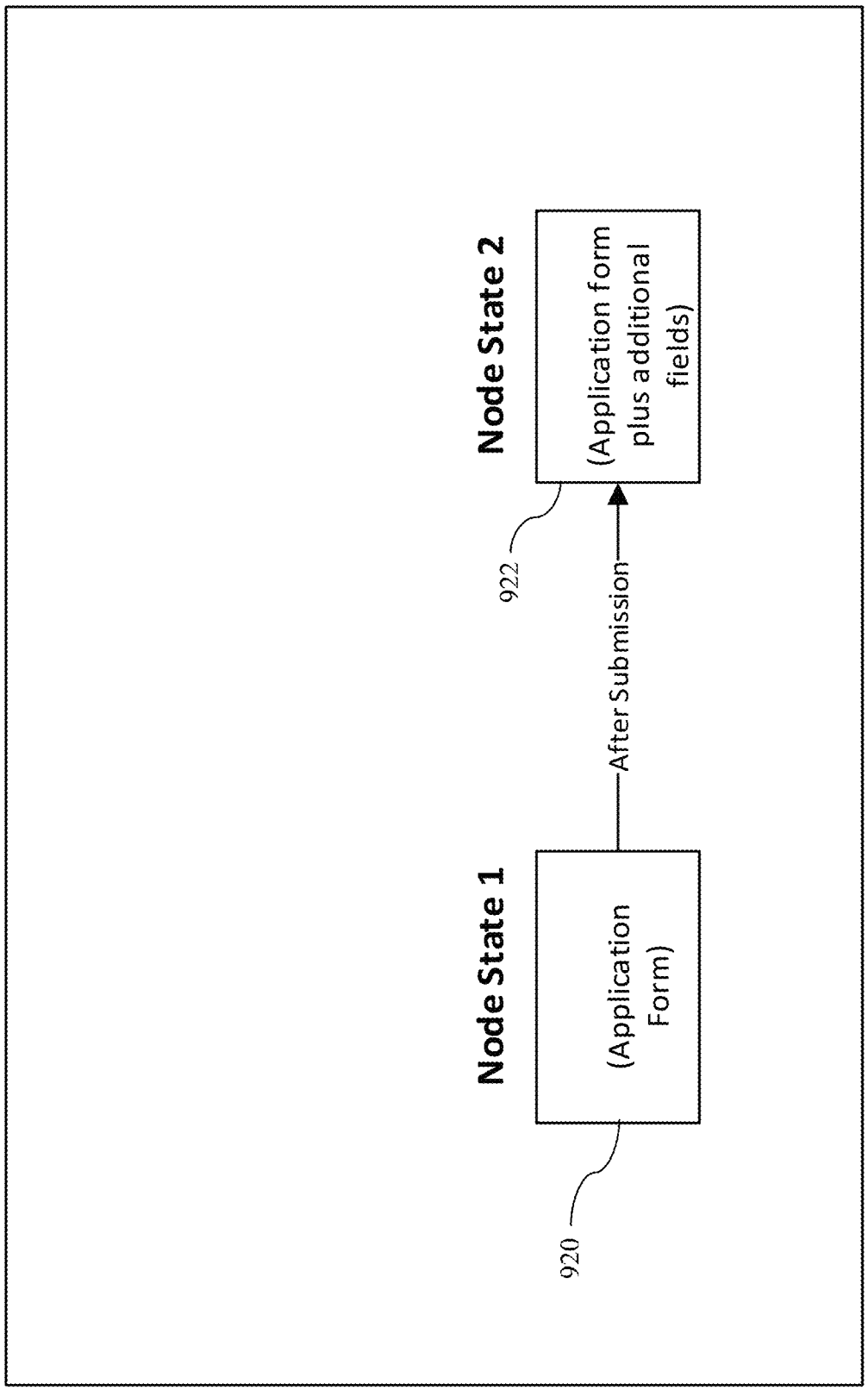

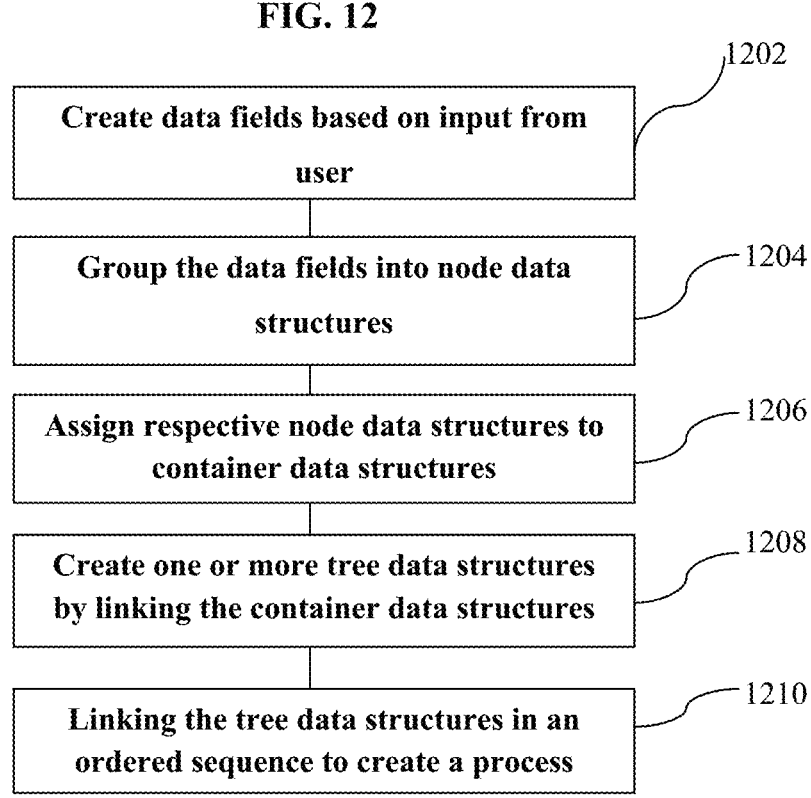

SYSTEM AND METHOD FOR SOFTWARE DEVELOPMENT USING GRAPHICAL TREE STRUCTURES

CROSS-REFERENCE TO RELATED APPLICATIONS

This Patent Application is a continuation of U.S. patent application Ser. No. 14/962,598, filed Dec. 8, 2015, which claims the benefit of the filing date of U.S. Provisional Patent Application Ser. No. 62/091,852, filed on Dec. 15, 2014 and entitled "System And Method For Campus Information Management," the entire contents of both which are hereby expressly incorporated by reference.

FIELD OF THE INVENTION

The present invention relates generally to software data and control structures; and more particularly to software development using graphical tree structures.

BACKGROUND

There are major challenges for information technology (IT)-based solutions to support business processes, such as, the required flexibility (manage different data entry forms, different study rules etc.), the capability of handling highly complex rule sets (competitive selection processes, study rules, dissertation rules) and still provide an easy to use interface, that allows a user to visualize, understand and edit the modeled processes and therefore offers a quick and effective method to adapt to changes.

For example, educational institutions need to manage student applicants, admission, course registrations, performance records and multiple other processes around students training and administration. All these processes differ between the educational institutions level (preschool, school, college, university etc.) the governmental regulations (depending on degree type, country etc.) and the institutions individual requirements for a specific process (specific rules for student selection procedures, training specifications etc.).

The core aspects of all these processes are the collection of data (e.g. through an application form), its distribution to the people concerned (e.g. reviewers within a selection process) and the processing of the data according to defined rules (e.g. different steps in an application process for students with a foreign degree) with a defined result at the end of the process (e.g. letter of acceptance to the study program).

SUMMARY

In some embodiments, the present invention is a web-based graphical software creation platform for different applications executed by one or more computers, without requiring professional software development skills and independent of any computer programming languages.

In some embodiments, the present invention is a method for building a software application for execution on a computer. The method includes: creating a plurality of data fields based on input from a user and storing the plurality of data fields in a computer memory, each data field having a value or a reference to another data field; grouping the plurality of data fields into a plurality of node data structures, each node data structure having a list of data fields contained therein; assigning respective node data structures of the plurality of node data structures to a plurality of container data structures in the computer memory, respectively, wherein each container data structure stores information about conditions, actions, actions results, and permission settings to operate on one or more data fields, wherein conditions for each container data structure are created based on information in the nodes of each container data structure or other container data structures of the plurality of container data structures, wherein each condition checks for information in the data fields of a node data structure, a status of a node data structure, and wherein each condition triggers an action when it is satisfied; creating one or more tree data structures by linking the plurality of container data structures in a predetermined hierarchical manner; and linking the tree data structures in an ordered sequence to create a computer executable process for performing an application, wherein the plurality of node data structures, the plurality of container data structures, and the one or more tree data structures are created independent of any programming language.

The built software application may be an application for recruiting an applicant based on an application of the applicant, for curriculum management of a student, for payment processing of a payment made by a payer (as described in detail below), or any other business process application.

BRIEF DESCRIPTION OF THE DRAWINGS

FIG. 4 depicts a simplified exemplary process flow diagram for a recruiting process, according to some embodiments of the present invention.

FIG. 5 illustrates a simplified exemplary process flow diagram for a curriculum management process, according to some embodiments of the present invention.

FIGS. 9A-9C illustrate various operation on the nodes, according to some embodiments of the present invention.

FIG. 12 is a simplified exemplary process flow diagram for building a software application, according to some embodiments of the present invention.

DETAILED DESCRIPTION

In some embodiments, the present invention is a software application that includes a plurality of tree structures for data management, without the user having to do any complex coding. The tree structured interface, in combination with freely defined forms, allow users to build software, without writing any programming code or the need to use and learn a proprietary configuration language.

Figure 1:
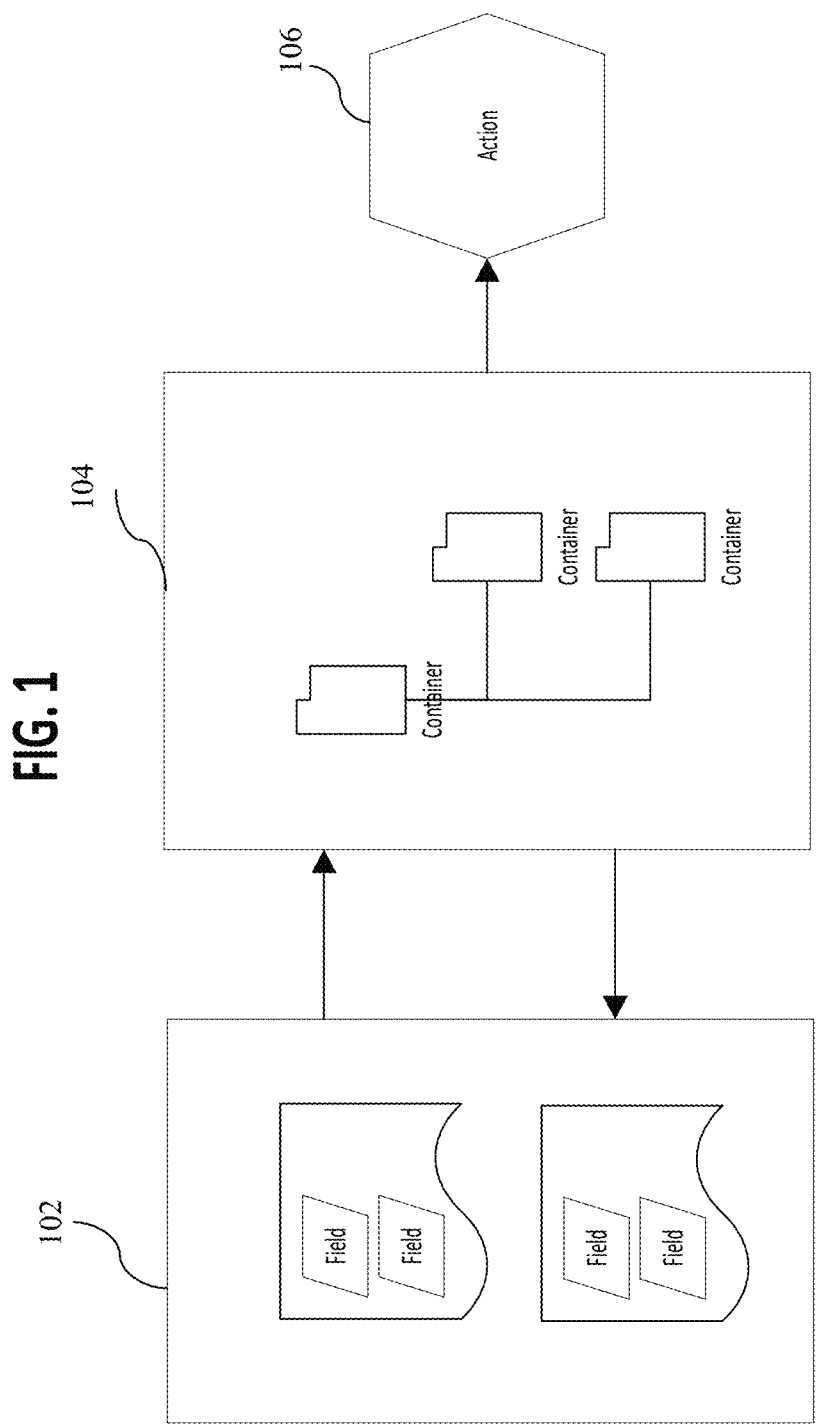
FIG. 1 is an exemplary block diagram, according to some embodiments of the present invention.

FIG. 1 is an exemplary block diagram, according to some embodiments of the present invention. As shown, in some embodiments, the invention comprises of three major functional units, a form editor 102, tree structures 104, and action modules 106, for example, for sending emails, creating documents, initiate bank transactions, etc. The present invention allows a user to link the tree conditions to any data element (e.g. field) that has been created, using the form editor 102. This allows the creation of custom software for any possible use case. As shown and explained below, software applications, such as, web application portals, curriculum management systems, business process management suites or payment administration solutions, or other similar applications can easily be built using the present invention. Moreover, the user does not have to write any programming code nor use a proprietary configuration language, in order to configure the control and data flows, data dependencies and conditions for these applications.

Conventional software solutions provide a set of system fields, that the software uses to operate. Individual fields can often be added to allow individualization to a certain extent, but the conventional software does not operate on individual information. In contrast, the software of the present invention does not need the system fields, rather, it is capable of operating on any information created in the system. Any information object (field) that the system uses is created by the user using the node type editor, so that only the necessary information is used in the system and the configured software logic can perform the desired action.

The present invention greatly improves other areas of technology, such as manufacturing, inventory management, medical diagnosis, agriculture, entertainment and stage production, advertising, transportation, and the like, the personnel of which are not typically trained for computer programming. However, the present invention would encourage, enable and assist a relatively easy-to-implement automation to improve the above-mentioned technological areas.

In some embodiments, the invention lets a user create and operate only with those fields that are needed, and configure the processing of that information in the way the user wants it to process.

Conventional enterprise resource planning (ERP) solutions use predefined objects like invoices, which include fields like account number, price, sum etc. to perform system functionality (summarizing, billing functions etc.). Similarly, conventional customer relationship management (CRM) systems use contact items to perform actions thereon. In contrast, the present invention does not need any predefined objects, rather the container data structures of the present invention are created as the requirements for an application. Before the initial configuration, the "forms" that later provide the user interface are empty/null. This allows the administrating user to freely design those forms and the information collected therein. The user can create forms that act as invoices, or forms, that act like contact addresses, or class certificates or application forms. As all software logic is defined in the engine of the present invention as an individual configuration, the present invention can be used an ERP or a CRM system, a campus management system, an event management platform, a location and facility management solution, a safety and compliance management system, a clinical trial management system, a cost and expense management system, a corporate communications platform, a mobile app central database and controlling system, a government process solution or validation (covering processes from grant applications to driving license issuing), and the like.

In some embodiments, the invention is a development framework, rather than a software application, however, the invention can also be used as a software application.

Using a concept of fields and conditions and iterating them using a unique process, a user can build complex and different applications, even though he is only using fields and conditions. The complexity of the software is not carried by the underlying code, rather, it is carried by the tree structures of the software. This allows a user without any technical or coding knowledge to build unlimited complex algorithms and process conditions, by building multi-level tree (and therewith condition) structures.

In some embodiments, the present invention is capable of freely defining the structure of the data that is being processed and allowing full flexibility in defining how data is processed. In some embodiments, the present invention includes a model to structure the data that are collected and processed. By providing this model, different concepts of data processing (grant applications, job applications, curriculum management, training records etc.) can be configured and managed with the same set of interfaces. This persistent model is the basis to make complex rules, permissions and actions easy to configure and visualize. It includes structural elements, such as "Fields," "Nodes," "Container," "Trees" and "Processes." Functional elements "conditions" and "actions" can be applied at each level of the model and individual permissions can be managed at every level of the software.

In some embodiments, the "conditions" and "actions" elements are graphical interfaces, that allow a user to defined software logic on an "if this, then that" basis. This can be also applied to any element (e.g., fields, node, container etc.). This concept of nesting logical objects with "if this, then that" logic allows a user to build complex software logic by using an easy to work with user interface.

Figure 2:
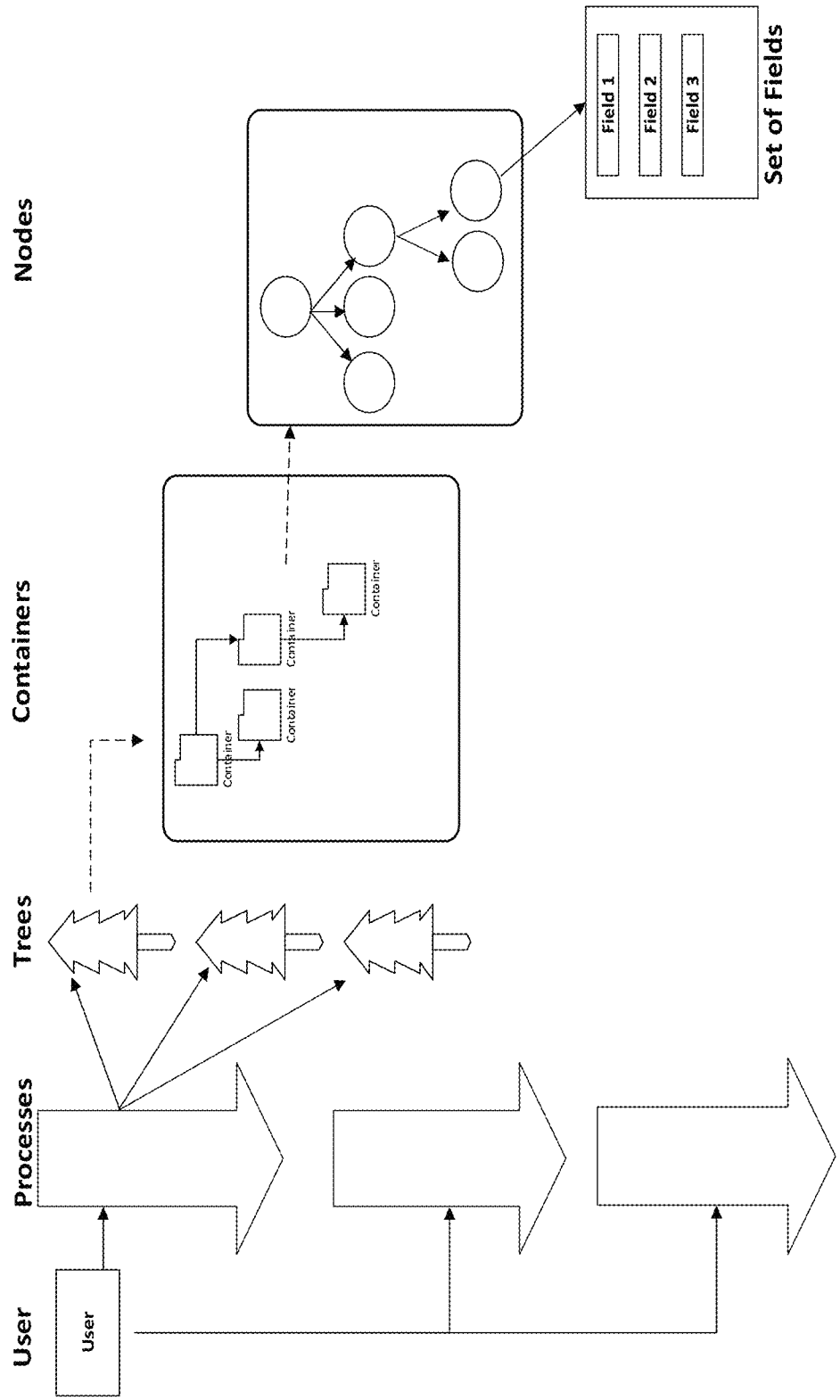
FIG. 2 shows a simplified exemplary process flow diagram, according to some embodiments of the present invention.

FIG. 2 shows a simplified exemplary process flow diagram, according to some embodiments of the present invention. As shown, in some embodiments, during the process of the initial configuration, a user creates (data) fields, e.g. fields of contact details, education information, referees and research interests. The user may also add some conditions and actions directly to some of the fields, e.g. some fields only appear, if previous fields have been marked with "yes." For instance, a field "Email" may contain a condition and an action. The condition to this field may be "if input is valid Email adress" and the actions are "create new user with this email/create a rating node for this user/notify this user with an email."

If the user has filled in all required fields, he can "submit" the node, which will check the condition "are all required fields filled in?" and then trigger the actions "change state of application node/create rating node for coordinator/notify coordinator and applicant by email." This scheme continues until the last step/level in the tree is reached.

In some embodiments, the invention provides an infrastructure, that allows a user to install or develop web based software by using tree structures. In contrast to a traditional software development platform/environment, where users have an operating system as a base tier and software applications that are running on top of it, the software engine of the present invention represents a base tier and the trees represent the software applications running on it. Trees can be installed on the invention's software engine just as applications can be installed on an operating system. Trees can also be modified by the user or even be created by the user from scratch and combined with each other.

Contrary to software applications running on an operating system, the trees don't have to be coded in a general or custom programming language. The trees are just assembled and configured using a graphical user interface. Due to the hierarchical condition design of the trees, using tree containers and nesting and connecting them, a user is capable of building highly complex applications for various purposes, without actually performing program coding. In contrast to a software development kit (SDK), the tree configuration of the present invention does not create software code based on the user using a programming language, which makes the software-as-a-tree model safer, more portable easier and more transparent than any former software development technology. Moreover, the tree configuration is safer, because the input/output of any data is managed by a data processing engine and not by direct access to a data source as it would be the case when coding a software in a standard environment, defining variables and reading them directly from a data structure visualized in a tree data structure with all its dependencies and data elements. Some existing software development frameworks support the visualization of the program code in some ways, but there are always parts of the code not "visible" in the structural or object view translation of the software code. In contrast, anything the software of the present invention does can be reflected in a graphical display. To better illustrate the structure and functionality of the software-as-a-tree model of the present invention, different application cases are described below, where relatively complex software is built using the invention's engine and different trees structures.

Figure 3:
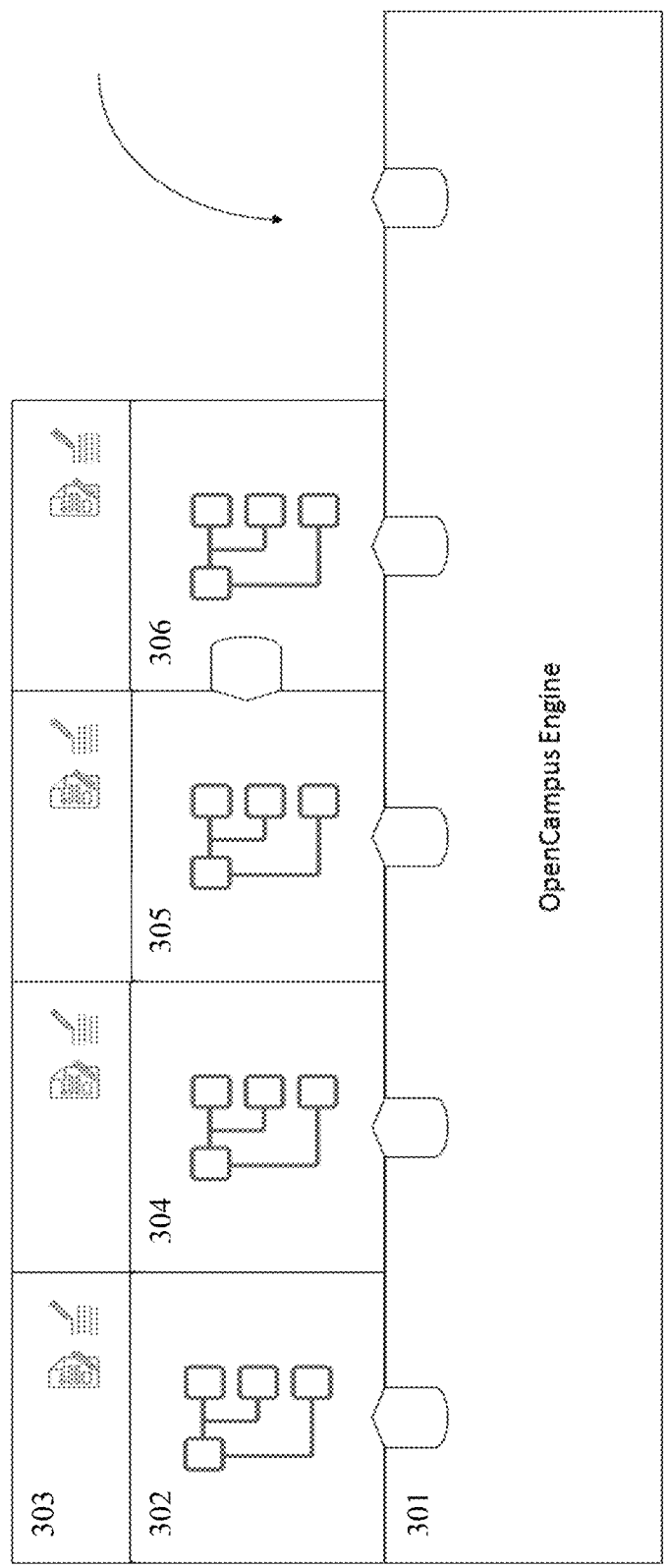
FIG. 3 shows an structural model of the invention's engine tree architecture with selected tree examples.

FIG. 3 shows an structural model of the invention's engine tree architecture with selected tree examples. The invention's data processing (e.g., OpenCampus™) engine 301 represents an operating-system-like layer for the software applications (trees). In some embodiments, the engine monitors any information input into the system, checks the relations of the entered data to referring trees, attaches the data to the respective containers of the respective trees, then checks the conditions inherited from the container, crosschecks conditions to other containers/trees, updates the data if necessary, and executes the actions, linked to the identified conditions. This loop may be repeated until no new condition is found or nor new data is entered/created. Each tree (302, 304, 305, 306) has an interface layer 303 that defines the input and output of information (forms, lists etc.). Trees can be connected (305 and 306) to interact with each other. Further, trees can be added any time and can access all the data processed through the invention's engine.

A field refers to a data element used to store different values. A value in a field can be numbers, text, image or even a reference to another field. A field can be a single text input field to store e.g. the last name of a user. It can also be a dropdown list of values that allows a user to pick one or several items, as well as a reference to other fields and nodes.

The software functional elements, conditions and actions, can be used to work with fields. For example, a field condition may check if the entered data is an email address (e.g., whether the condition contains "@" character and top level domain) and may send out an email to the specified address.

The invention includes a graphical interface that allows a user to create a condition by clicking on the desired fields and comparing them to values or nested combinations of fields and conditions. Moreover, according to the present invention, conditions can be applied to any stored information.

A defined set of fields is called a node, which is an item of structured data. A node stores fields, their conditions and the corresponding actions. A node may be the collected data from several fields in a defined structure. The structure of the node, the list of fields that belong to it, is defined in a node type. A node also allows to store and apply information about "conditions" and "actions." For example, a node can be "submitted" and therefore its state can be changed. As a result, the submitting user cannot edit the node any more, but another user may now edit fields on this node. Also, a document (e.g., a PDF document) may be created as a result of the node submission.

A condition is a process or algorithm (e.g., entered by a user) used for checking certain values in the system. It can be applied to a field as well as to a container. Condition are checked by the system, whenever the specified data element (field or container) is processed in the software.

In some embodiments, the invention makes the node subject to condition and action and therefore builds a micro process or a mini program inside a node. For example, the processing of a grant application can be done within a single node within the present invention, by putting all fields relevant to the processing of the grant into one node and enabling and computing them step by step, requesting input from different users and performing actions, whenever the status of the node has changed.

A container is a data structure element to group nodes and store the information about conditions, actions, actions results as well as permission settings. A container also represents the visual interface used to configure node assignments, conditions, actions, actions results and permissions. Containers can be set (linked) in relation to each other, allowing the configuration of cascading conditions, actions and permissions. A set of related containers is called a tree. Containers are elements to group nodes and define node relations by defining relations to other nodes. Conditions and actions can also be configured for this structural element.

Containers can check the field values in all nodes that are assigned to the container. Containers also provide the visualized feedback for the user about the result of the checked conditions. Containers can be configured to perform actions, such as summarizing the values of certain node fields, creating mean values, etc. According to some embodiments of the present invention, containers represent the individually built software routines as nested objects of "if this, then that" logical elements. In this unlimited combination of containers, most complex logics can be built, individually, as their content is not predefined in the software.

A tree is the definition (grouping) of containers and their relations to each other. A tree data structure is used for visualizing and configuring the relations of containers and nodes in the system. Trees allow cascading conditions and actions, and therefore building complex cascades with an unlimited amount of levels. Trees support conditions and actions as a graphical interface and include certain intelligence about what happens inside of the trees (results from containers, statuses etc.). The results structure is configurable by the user. Trees can also create containers to hold forms, and build conditions that compare the value of a specific field with a given value to check, if the condition is true. The field selector in the condition interface can check forms inside the container, inside another container, inside a container an all its child containers, of the current tree, and/or of a linked tree. This check may be performed using logical operators like "all of" or "one of" and use mathematical processors like "sum of", "mean of", "min of" etc. Conditions can be nested using logical operations like AND an OR to build unlimited condition rule sets. A tree can process information with the above mentioned operators and store the results in new forms.

A process is the definition of possible combinations of trees and their ordering. It describes which trees may be connected and allows to store general configuration settings (e.g. repetitions, concurrent processes, etc.). A user can be assigned to one or more processes.

FIG. 12 is a simplified exemplary process flow diagram for building a software application, according to some embodiments of the present invention. As shown in block 1202, a plurality of data fields are created by the engine, based on input from a user and then stored in a computer memory. Each of the data field includes a value or a reference to another data field. In block 1204, the data fields are grouped into node data structures, where each node data structure includes a node state for specifying allowable operations on its data fields and a node type for defining its structure and a list of data fields contained therein. In block 1206, respective node data structures are assigned by the engine to one or more container data structures in the computer memory respectively. Each container data structure stores information about conditions, actions, actions results, and permission settings to operate on one or more data fields. Further, each container data structure is capable of being linked to another container data structure and capable of cascading the conditions, the actions and the permission settings, as explained above. The conditions for each container data structure are created based on information in the nodes of the respective container data structure or other container data structures. Each condition checks for information in the data fields of a node data structure, a status of a node data structure, or a status from another container data structure, and triggers an action when it is processed or satisfied.

In block 1208, one or more tree data structures are created by the engine by linking the container data structures in a predetermined hierarchical manner. Each tree data structure includes information about relations of container data structures and node data structures in each tree data structure. In block 1210, the tree data structures are linked in an ordered sequence to create a computer executable process for performing an application. As described above, he node data structures, the plurality of container data structures, and the one or more tree data structures are created independent of any programming language. That is the user does need to have any knowledge of any programming languages to build the software application, according to the present invention. The built software application may an application for be recruiting an applicant based on an application of the applicant, for curriculum management of a student, for payment processing of a payment made by a payer (as described in detail below), or any other business process application.

1. Recruiting Example

FIG. 4 depicts a simplified exemplary process flow diagram for a recruiting process, according to some embodiments of the present invention. In this example, the invention is used to provide a web based online application form that contains rules that assist an applicant in filling in the application form correctly. The invention provides communication between applicant, application, reviewers and HR personnel through the web platform. It provides automatic calculations to compare applications. It also provides a web based selection list that allows multi editing of application form, ratings, feedback letters etc. Basically any task within a recruiting process (for the applicant, for reviewers, for the HR department) is capable of being completed through one single web site. Job applicants can register at a portal, fill in an application form and appoint two referees who will provide a letter of recommendation to them. After the applicants submit their applications, an evaluation process is started in which an HR manager and reviewers from different departments rate the candidates' applications. Ratings for each reviewer is collected and a final score is calculated. An applicant is then invited or refused based on the final score for her.

As shown, container 404 represents a parent folder for a job application form and returns "Application submitted successfully" when its child containers 406 and 408 return the value "Required documents submitted." Container 406 is a container that accepts the application form as filled in by the job applicant. When an application form is submitted, container 406 checks whether the field "Referee Email" is filled in or not. If it is not filled in, the container returns the value "Required documents submitted" as no further documents are needed to consider the application as complete. If the field is filled in, the container triggers the actions "Send email to referee" and "Create letter of recommendation form for referee in container 120". Container 408 returns the value "Required documents submitted" as soon as the referee filled in and submitted the letter of recommendation form.

When container 406 and container 408 return the value "Required documents submitted," the parent container 404 returns the value "Application complete" and therefore triggers the action "Create Preselection form and assign to container." Then, the preselection form is present in container 412 waiting to be filled in by the central coordinator, that pre-ranks all the completes applications. The coordinator can then evaluate the application, check the letter of recommendation and then fill in a field "Next round" with "Yes" or "No".

When the preselection form is submitted, container 412 returns the value "Next round" or "Refused." If the value is "Refused", then container 410 checks for the returns values of containers 412, 414 and 416, and returns the value "Refused." If container 410 returns "Refused," then container 402 also returns "Refused" and based on that return value, container 402 triggers the action "Send an email to the applicant to inform him, that he has not been chosen," as shown.

If the return value in container 412 is "Next round", then two evaluation forms are created and assigned to container 414. These forms contain a scoring sheet that is filled in by the HR managers of the organization. Container 414 now checks all of the submitted forms in it for the HR managers scoring. It then calculates the mean value of the two scores submitted through the evaluation form and presents that total score as a return value.

If the return value is <5, then it returns the value "Refused". In this case, container 410 returns the identical value and also container 402 returns that value, followed by the email as mentioned above.

If the return value is >5, then container 412 triggers the action "Create final decision form". This form contains a field about the final decision of the application called "Final decision" which is again filled in by the central coordinator.

If the submitted value in the final decision form is "No", then container 416 returns the value "Refused" and consecutively container 402 returns the value "Refused", followed by the email as mentioned above. If the value of the final decision form is "Yes", then the container returns the value "Accepted", also container 410 returns the value "Accepted" and container 402 returns the value "Accepted." Container 402 triggers the action "Send invitation email to applicant".

Using parent container 410 makes it easier to check a condition. For example, the condition in container 410 checks "Is any child container returning the value 'Refused'" in order to identify its return value. Without container 410, the users would have to write a separate condition for all three child containers (412, 414 and 416) wherever she wants to check for "Refused" or "Accepted." However, using container 410, the users have to check one single container. Parent containers can be used to sum up the decisive information used by other conditions or actions.

Similarly, using a parent container, e.g., container 410, makes it easier to manually override the process. For instance, by manually entering a specific return value, e.g., "Accepted" at the position of container 410, the users can shortcut or override the evaluation process. If a candidate has already been accepted and does not have to go through the evaluation process, using an override at the position of container 410 terminates the process. No further information about the details of the evaluation process (containers 412, 414 and 416) has to be considered.

Using a parent container, e.g. container 414, makes it easier to assign permissions. Theoretically, all evaluation forms could be stored inside container 410, and thus the user would have to just make the conditions inside 410 a bit more complex. But having the forms separated into different child containers makes it easier to assign access permission, for example, for the evaluation done by the HR department, the user just sets the simple rule "All forms inside container 214 can be edit by users with the role "HR department."

2. Curriculum Management Example

FIG. 5 illustrates a simplified exemplary process flow diagram for a curriculum management process, according to some embodiments of the present invention. In this example, the software application developed using the software creation platform of the present invention, is capable of collecting, processing and distributing data within educational, governance and administrative processes, such as student application, admission, curriculum management and performance record management. As a requirement of the curriculum management, students should have a structured academic record that shows the requirements and achievements in their study program. As part of the curriculum, there are certain rules about what achievements have to be collected, how they are collected and how they may link to each other.

In this example, a student is studying a curriculum called "Curriculum Astrophysics 2014" 502. In order to successfully pass the curriculum, the student has to pass a mandatory subject 504 and a module 512 to allow him to choose from a list of different subjects (514 and 516), as depicted in FIG. 5. While the subject 504 already defines the lecture, the student has to attend and pass. The wording for these elements (subject and module) is commonly used in structuring curricula but does not reflect any technical specification as all elements shown are just standard containers in the invention's tree design.

In order to successfully pass "Astrophysics" and receive the certificate for that (container 504), the student has to fulfill (achieve return value "passed") the requirements of container 506 and container 508. Container 506 returns the value "passed" as soon a submitted form inside the container shows the value "passed" inside the field "quality." This form could be generated manually by a teacher or created through an automated process from another system application like "Course Management Engine." Using a field "quality" and the value "passed" is an example for this example. The same concept also works for using a field "score" and requesting the field to show at least "60%" in order to reflect the value "passed." By allowing the container to check for "any field" compared to "any value", the requirements of any curricular concept can be mapped in the present invention's tree model, no matter if the model is based on score, credits, grade points, or others.

For container 508, a similar rule is set, except for the fact that also the number of "failed" attempts is counted. For every failed attempt in the exam "Astrophysics," the student receives a form, showing the value "failed" in the field "quality." If there a three forms (attempts) showing the value "failed" the container returns the value "finally failed" and this may lead to a final dis-enrollment of the student, as the base container (1) of the tree returns the value "finally failed." This shows a simple and flexible implementation of common "examination rules" for a curriculum, especially as the rule "three failed attempts" is not necessary linked to every written exam, but can be configured individually for every container.

When container 504 receives the return value "passed" from all its child containers, it also returns the value "passed" and will create a certificate form that can also be printed as PDF document. That document can be accessed by the student to receive a written confirmation about his achievement. In order to reflect his individual performance, the "grade" value from the exam form is inherited to the certificate form. In this simple example, we are just using unprocessed inheriting of a value. With several graded achievements form different containers, processing of mean values or sums to reflect the performance can also be used.

Container 512 shows a slightly different configuration than container 504. In the case of container 512, not all the child container have to be passed, rather only one container needs to be "passed." This is an example on how to use "choices". That is, the student can choose between the subject Math I (514) and the subject Physics I (520). If the student receives all required entries for 514 (which means attending the seminar and passing the exam) container 512 already shows the return value "passed" as already one child container is passed. Container 520 does not have to be "passed" any more.

The same concept can be used in a more advanced way by using "selections" like "pass 3 subjects out of 10" and offering the student a list of 10 different subject containers and configuring the parent container (512) to check for "3 passed child containers," or it can be used with "sums" like credit point. Container 512 can be configured to be passed when "the total sum of credits points in all child containers is 20.". In this example, the student has to attend and pass as many subjects as needed to achieve a total of 20 credits, not depending on the number of subjects (containers) passed.

There is also the possibility of connecting containers from other trees to the present tree. The container 510 is part of another tree, "Curriculum Astrophysics 2009,"which is a former and now outdated study program. Let's assume, there is a student, that initially studied in the former Curriculum 2009 and now wants to move to "Curriculum Astrophysics 2014." The student wants to have all her previous achievements to be acknowledged in the new curriculum. Standard concepts for the "equivalency" of former achievements can be created by linking containers of different trees. In this example, container 510 that represented the exam "Astrophysics" in the curriculum of 2009 is linked to the container 508 as an optional child container. Condition 1 of container 508 checks, if "the field 'quality' in a submitted form in this level or below is 'passed.'" This means that the system also check for forms that are present in child containers below 508. As a result, a student who has already passed the exam Astrophysics in 2009 will not have to do the exam in the 2014 curriculum.

With the possibility of designing any type of data element (form containing fields) combined with the possibility of designing conditions based on any of these fields, an unsophisticated user, using the present invention, can built her own software application utilizing custom user interfaces (forms with fields) and a custom software logic (tree and conditions).

3. Grants & Payments Processing Example.

Figure 6:
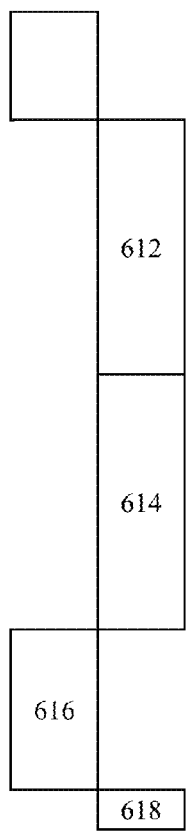
FIG. 6 shows a simplified exemplary process flow diagram for a grants and payments processing process, according to some embodiments of the present invention.

FIG. 6 shows a simplified exemplary process flow diagram for a grants and payments processing process, according to some embodiments of the present invention. This example demonstrates the option of connecting trees in a different way, for example, how trees can be connected to process certain forms in a predefined way by using another tree as a sub-process. In this example, a student can apply for different grants at his university. Her total amount of grant volume is $2000 (602). She may apply for travel grants and for lecturing grants. The student may also apply for a maximum of three times for each of the grants and the budget for the travel grant may not exceed $1000 (604), while the budget of the lecturing grant may not exceed the budget if $1500 (606). As long as there is still a grant application possible for the student (allow grant application"), the student can create a grant application form in container 604 or container 606, depending on the type of grant. When this form is created, a-sub tree is assigned to the created form. This sub-tree will now be traversed in order to verify, if the grant application will be accepted.

With the submission of the grant application, two forms are created in container 612, requesting members of the Science Department to check the grant application for its content, whether the grant can be given from a content point of view. Only if both members of the department have approved their forms, the next step is trigger—the creation of a form for the Financial Department. The Financial department will check if there are any legal or formal reasons, why the grant cannot be given. If everything no objections against the grant application, the Financial department approves the form, which consecutively creates a form for the payment in container 618. This form indicates, that a payment needs to be executed. When the payment is executed by the "Payment and Expenses department" the form is updated to the payment status "paid." This triggers container 2 to update its return value and consecutively update the status field in the origin form (grant application form) to reflect the value "paid."

For the case where a student has applied for three different grants, there would be three additional sub-trees in his grant application tree, opening from their origin forms in the interface.

Figure 7:
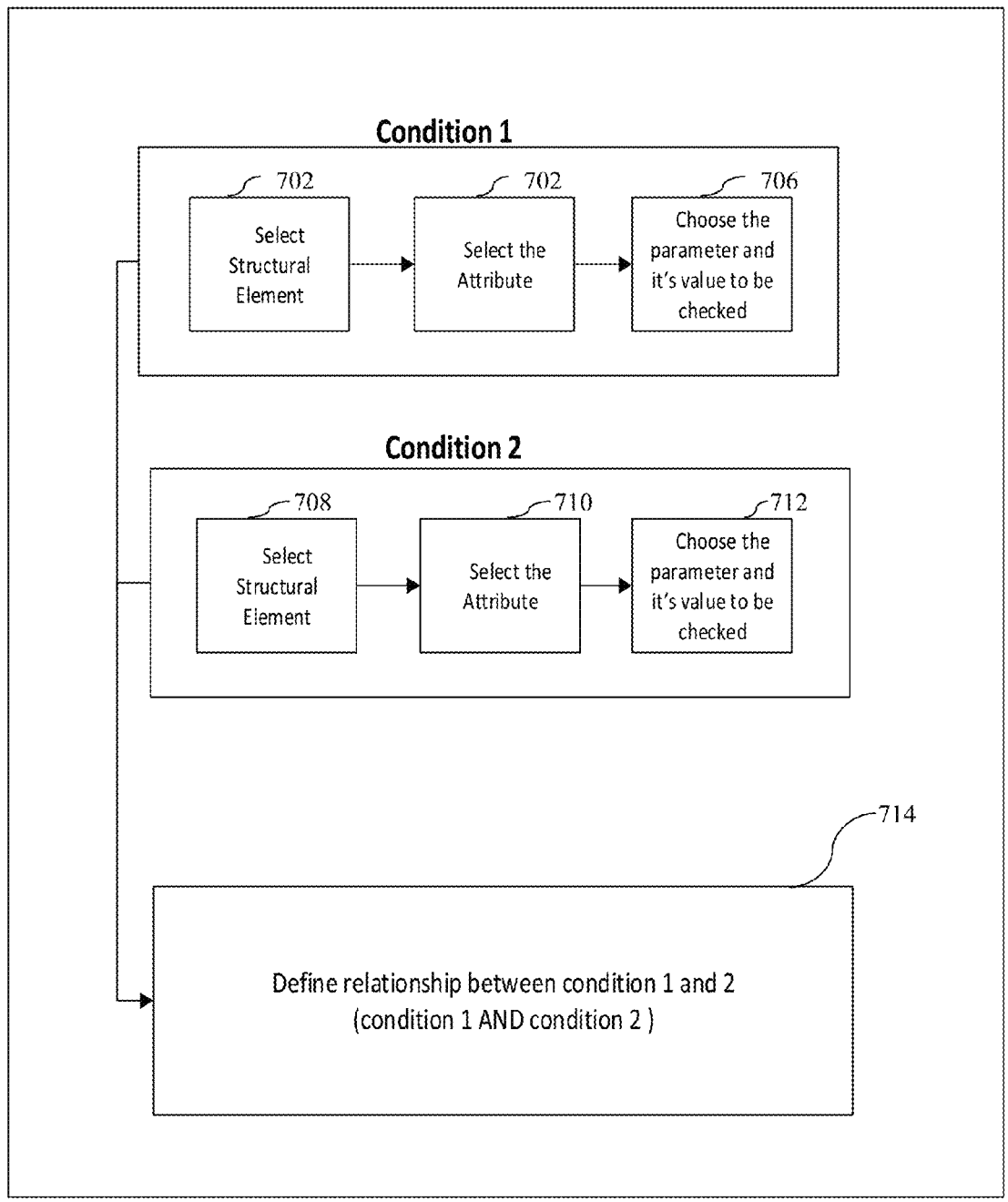
FIG. 7 is an exemplary block diagram for condition configuration, according to some embodiments of the present invention.

FIG. 7 is an exemplary block diagram for condition configuration, according to some embodiments of the present invention. In some embodiments, the condition configuration comprises of defining the conditions and relationships between those conditions, as depicted in FIG. 7. In block 702, the structural element is selected (field, node, container, tree or process), the attribute in this elements is chosen in block 704, and the parameter and its values to be checked are defined, in block 706. The same process is repeated for a second condition, Condition 2, in blocks 708, 710 and 712. A unique condition ID is automatically assigned to each condition by the system. For example, when a container is selected; any node inside this container with a field "field_land_der_hochschule" is being checked against the value 37, which represents "Germany". If the check is positive, the respective condition ID is marked positive. In this example, id "field_land_der_hochschule" is 37, then condition ID 3 is positive.

Condition ID return values can be further checked using AND/OR combinations in a structured algorithm. For example, if condition ID 1 is positive and condition ID 2 is positive and condition ID 3 is positive, then return value 1. The condition check in this container returns value 1, if condition IDs 1, 2 and 3 are met.

In some embodiments, the invention provide a condition/action interface that is capable of having any value anywhere in a database. Furthermore, the invention is capable of creating algorithms, processes, and/or logic with complexity that is derived by nesting containers with their conditions to a large extend and still providing the use with the ability to visualize them.

An action is the execution of a defined function in the software. An action is usually triggered by a condition and can result e.g. in the creation of an additional node, sending an email or creating a pdf document. Actions are predefined functions in the system that can be triggered in relation to a condition. Actions can be the creation of an additional node, sending an email, summarizing values and various others. Also, actions can be applied to any structural element and are generic in their use, that is, they can work with any data (as defined by the user in fields/nodes) and don't need the use of any system field.

With a graphical user interface, the configuring user selects the action ("Create Node," "Email," "Change Permission," etc.) and its trigger ("Return value") from container is 3.

Utilizing these structural elements and functional elements, a software engine according to some embodiments of the invention and executed by one or more processors/computers builds web based forms in various formats, and various trees to configure systems and/or to structure data based on certain rules and policies.

Using a visualization model, the invention is able to disclose logical errors in educational curricula, show optimization potential in workflows and explain complex rule sets generally hard to understand. The software of the invention can be used to detect logical faults in concepts and visualize data and processes understandably.

Figure 8:
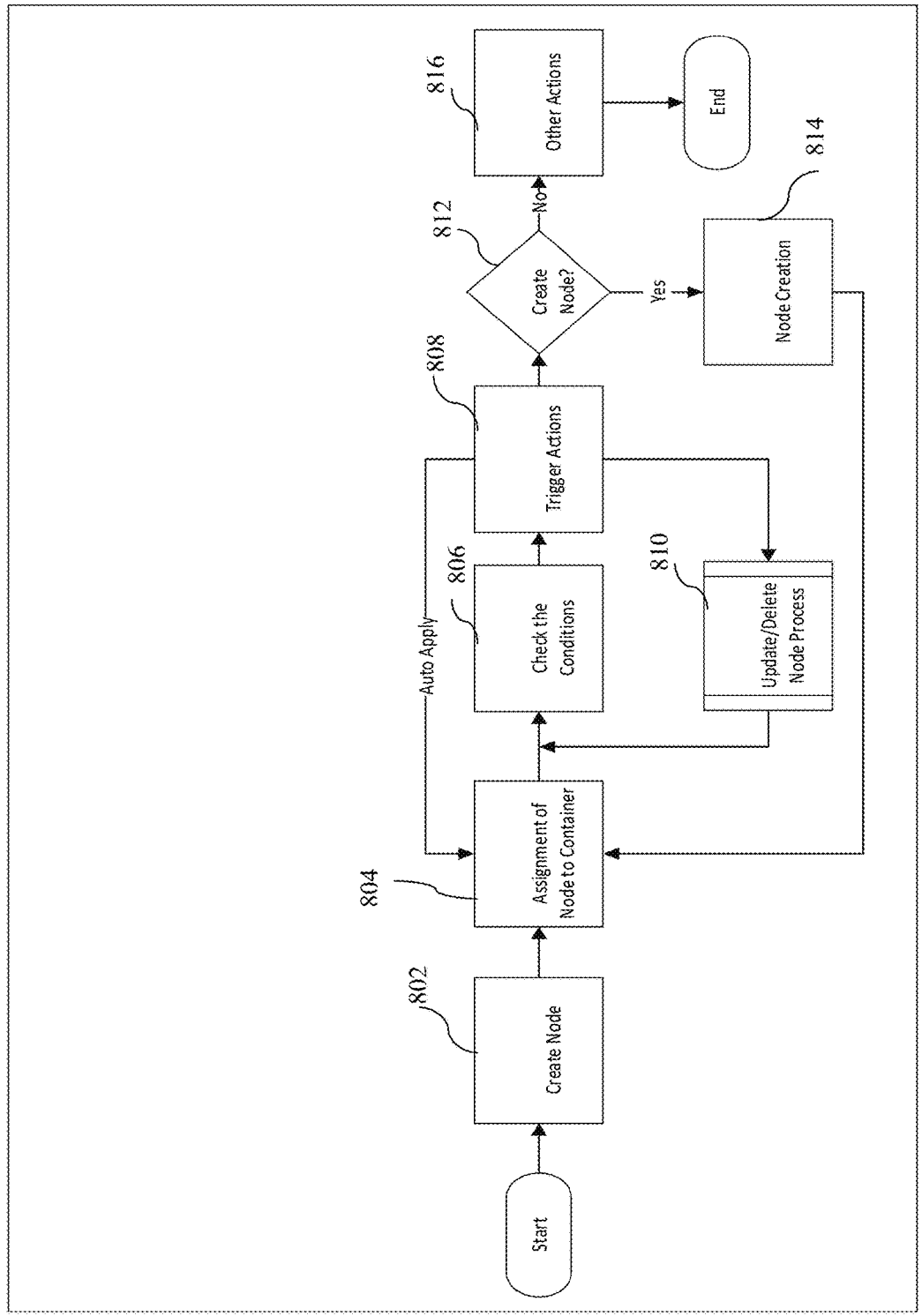
FIG. 8 shows a simplified exemplary process flow diagram, according to some embodiments of the present invention.

FIG. 8 shows a simplified exemplary process flow diagram, according to some embodiments of the present invention. The process also illustrates how both element types are being used together and how the invention operates, in some embodiments. As shown, a node is created in block 802 through a manual action or an automated process. For example, a container called "Internal Medicine" may hold two sub-containers "Practical Course" and "Exam." The condition in the container Internal Medicine is configured to automatically create a node of the type "Certificate" once all required sub-containers return the value "passed." For a given student, the "Practical Course" container is already "passed," when the student successfully attended the practical course and a node for that was inserted in the container.

The student now passes the exam for Internal Medicine and the exam results are received by the software of the present invention. Consequently, an exam node is created in the student's "Exam" container and as soon as that node is saved, the condition of the container Internal Medicine is checked automatically. Then, a "Certificate" node is automatically created by the invention and presented to the teacher to be signed.

Any type of data can be stored in a node, structured in fields as described in the "structural elements" definition. Once a node is created, the invention checks if the node can be automatically assigned to a container, in block 804. This is the case when there is only one possible target container for a node. If there are more than one possible target containers, the system prompts the user to choose the target container. For instance, when a "course" is created in a third-party system (this applies to any other connected functionality that is delivering data to the invention), target containers are defined by the user.

In some embodiments, as soon as the node is assigned to a container, conditions configured for that container are automatically checked and the respective return values are presented through the container. The processing of the conditions is described below and ends with returning a final condition value called "status."

Referring back to FIG. 8, in block 806, the condition is checked and if its value is returned, it triggers one or more actions, in block 808. The action(s) can result in updating an existing node (block 810), which can cause a loop, as the conditions are checked again since they may have changed through the node update. If no node update is triggered, the process continues to block 812 for creating a node, describe below.

Figure 9A:
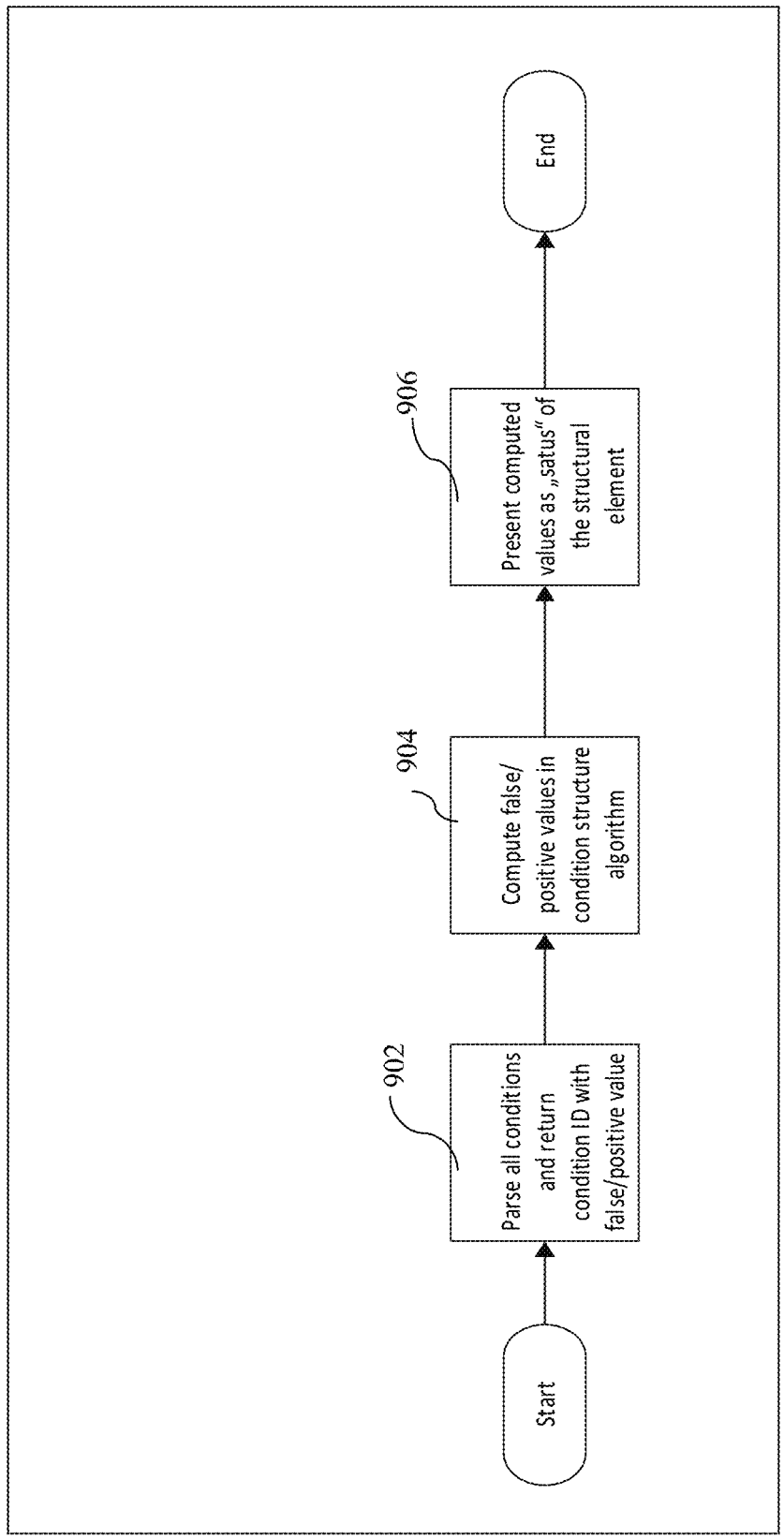

FIG. 9A shows a simplified exemplary process flow diagram for checking a condition, according to some embodiments of the present invention. As depicted, in block 902, all the conditions and return condition IDs with false/positive values are parsed. The false/positive values are computed in condition structure, in block 904. This approach facilitates the creation of complex condition checks. Conditions are initially created as simple statements each just checking for one parameter, e.g., "Country of birth IS U.S.A." Another condition check may be "Date of birth>1980." Each of the above two exemplary conditions may be TRUE or FALSE. Once a condition is created, a condition structure can be created. In a condition structure, single conditions are combined for a TRUE/FALSE check. For example a "Country of birth IS U.S.A." (TRUE) AND "Date of birth>1980" (TRUE) leads to a status of "accept." While, a "Country of birth IS U.S.A." (TRUE) AND "Date of birth>1980" (FALSE) leads to a status "to old to apply" and the combination of "Country of birth IS U.S.A." (FALSE) AND "Date of birth>1980" (TRUE) leads to a status "wrong track, redirect applications for foreigners."

In block 906, the computed values are presented as the "status" of the structural element. For example, starting with simple one-parameter checks, combining them in structures of any size, simplifies the management of the condition creation and reduces the risk of invalid process creation. Moreover, to provide a simple summarized result of the checks, the "status" is used to display the result. This way, a complex check appears as a single "status" value in the next configuration step and in the user front end (graphical user interface), where the complexity of the conditions being checked is hidden in the status. The status can then be used to base another condition thereon. This allows an iterative approach.

Figure 9B:
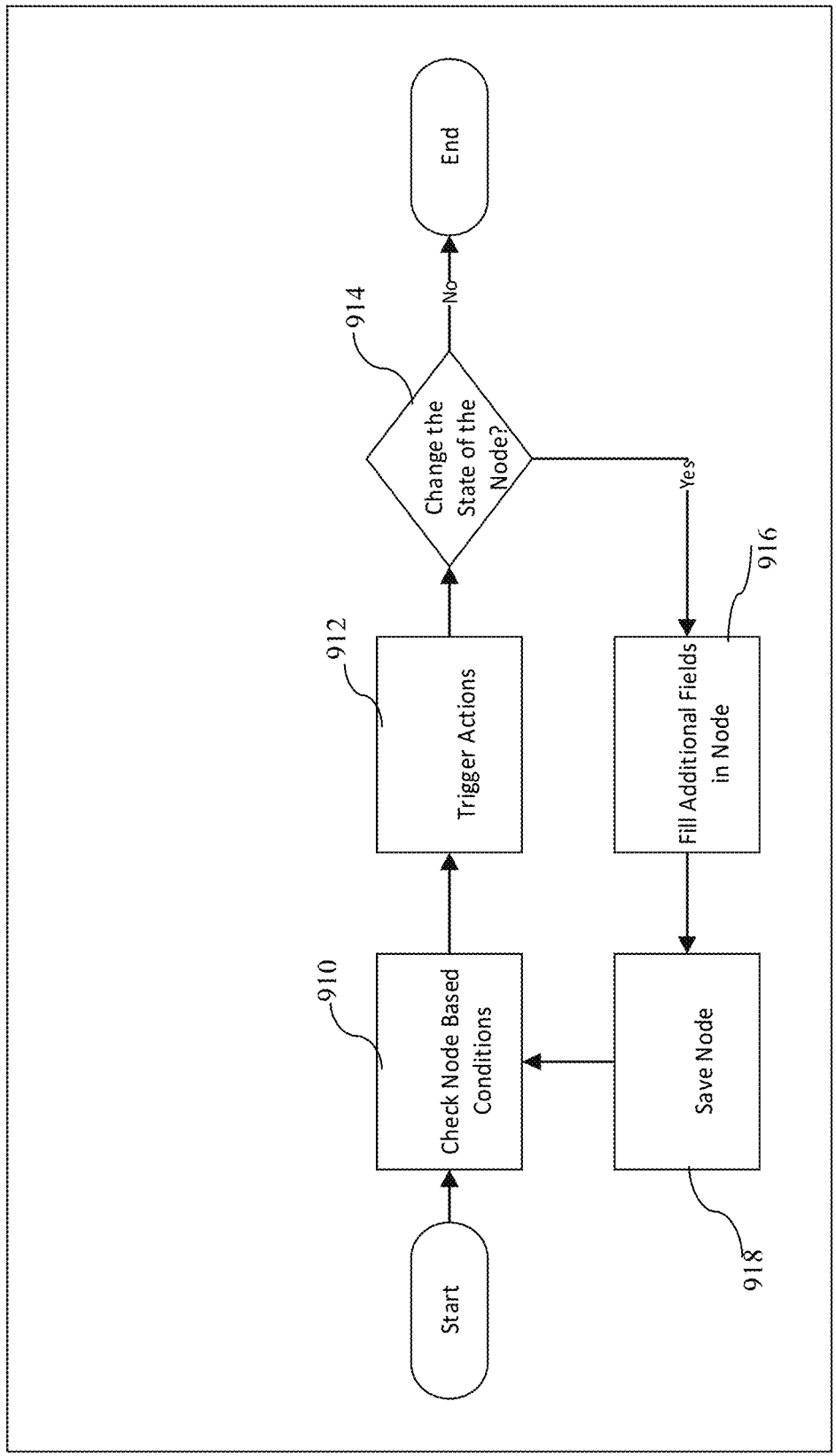

FIG. 9B shows a simplified exemplary process flow diagram for updating/deleting a condition, according to some embodiments of the present invention. The update/delete node process is a self-referring process, in which under certain conditions, a node modifies the existing data or adds new data to itself. For example, after changing the state of a node, additional fields need to be filled in. These fields could be filled automatically (computing mean values or sums etc.) or require the input by a user. In the case that input is required by a user, the node stays at block 808 of FIG. 8 until the user saves the node. After saving node, the process flow goes back to the checking conditions step and may go into the loop again. If the node is deleted, the process continues at block 3 and the present conditions are reevaluated.

As shown in FIG. 9B, the node based conditions are checked in block 910 and actions are triggered in block 912. If the state of the node is to be changed (block 914), additional relevant fields in the node are filled, in block 916 and the node is saved in block 918.

Referring back to FIG. 8, if the action in block 808 causes a new node to be created, a new node is created, in block 814. This determines if the process needs to go into a loop again or not.

A node may be recreated, as shown in block 814. In the case where a new node is created, the data in the node can be filled automatically with computed values or by a user. If the node requires input by a user, it waits until the user saves the node.

For every container, a summary node may be created that contains values of the nodes and containers below them. The values can be configured by the user and may store computed values or inherit information directly from the assigned nodes in the container or sub-containers. A summary node may, for example, contain the sum of all fields of the type "amount" in a container. The summary node is always recreated, when the values of the assigned nodes or sub-containers change.

If the action is not leading to new data being added to the process, other actions may be performed, for example, creation of various documents, sending of emails, and/or informing third parties of the updated status through an interface, as shown in block 816. The depicted "Other" actions in block 816 include object based program actions that can be extended any time.

In some embodiments, a node may have different node states in a process which provides the status of the node in a particular container. Various conditions can be defined based on the value of node states. An example is shown in FIG. 9C, which describes the benefit of having node states in a system. As shown in FIG. 9C, a student fills the application form (node) with a node state 1, in block 920. After submitting the application, additional fields are added into the node which is assigned to the professor for evaluation, in block 922. This state of the node is called node state 2. This way, different node states can be defined in the system and conditions can be applied thereto. In some embodiments, the present invention is capable of defining node states in terms of an (graphical) icon in the system. For example, a container may include an application form that is not submitted. The container may show a clock symbol, indication that the system is waiting for input. Once the application is submitted, the symbol may switch to a check mark, indicating that this step was completed successfully.

This provides a flexible way of managing the curriculum of a student. By configuring nodes, containers, conditions and actions in the system one can manage huge complex curricula of the students.

Figure 10:
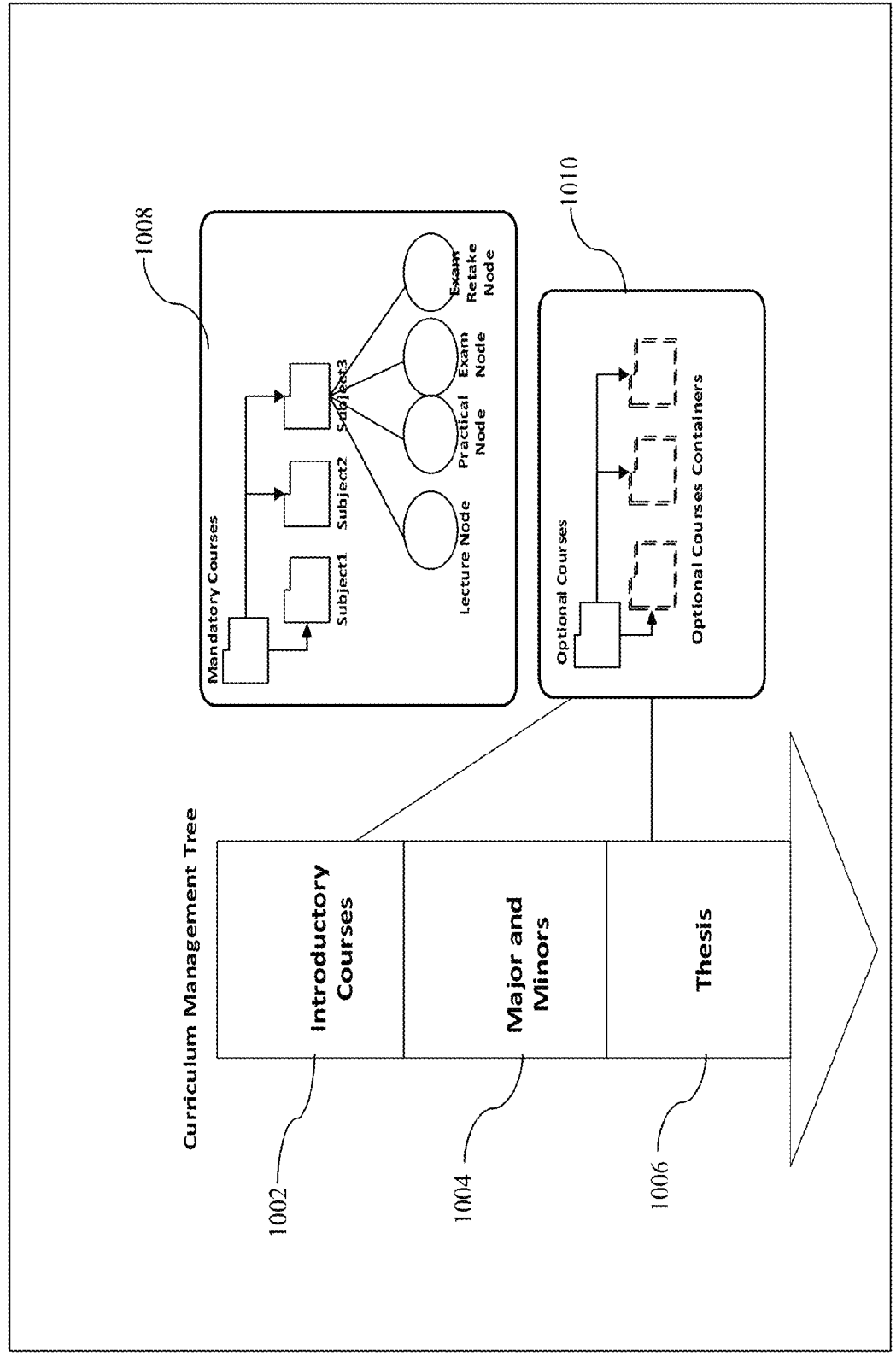
FIG. 10 depicts a simplified exemplary process flow diagram for configuring a tree for curriculum management application, according to some embodiments of the present invention.

FIG. 10 shows a simplified exemplary process flow diagram for configuring a tree for curriculum management application, according to some embodiments of the present invention. For example, let's consider a scenario in which a degree will be awarded to a student when he/she completes 120 credits. These credits are divided into three main sections, for instance, introductory courses 1002 (common for all students), major courses 1004 (vary from student to student) and a thesis 1006. Introductory courses may have both mandatory and optional courses. Mandatory courses may have different subjects, subject1, subject2 and subject3, as shown. Each subject may have various three components (nodes), for example, lecture, practical, exam and exam retake, as depicted. Optional courses have their own components such as exam, lecture, etc. Each student can choose an area of specialization from the list of majors which may further have various components, on the basis of which a grade is given. Also, the student has to submit a thesis which may be mandatory for every student.

As shown in FIG. 10, the invention provides the user with the capability of configuring a tree for curriculum management containing different processes such as introductory courses process 1002, major and minor courses process 1004, thesis 1006, and the like. In order to define mandatory and optional courses in the system, a container for mandatory and optional courses is configured. Inside a mandatory courses container, subject wise containers are configured, each containing the nodes for lecture, practical and exam. Similarly, optional containers are configured inside the system for holding optional courses nodes.

Once the structure is defined in the system, different conditions can be applied on nodes and containers at any level. For example, in order to pass in a particular course, it may be mandatory for the student to pass in all the nodes of that subject. Accordingly, in the present invention, a condition is applied on the subject container which checks if the state of all the tree nodes in that container is passed or not. If yes, then the state of that subject container is automatically marked as passed. Additionally, there can be a scenario in which every student has to pass in at least three introductory courses in order to complete the section of introductory courses. This is implemented in the system by configuring a condition inside the mandatory courses container. This condition checks the state of at least three subject containers marked as pass. If yes, then the overall state of introductory courses container is marked as passed, otherwise, it is marked as incomplete.

In some embodiments, the invention provides the flexibility of defining retake exams. For this, a retake exam node is created inside that subject container and a condition is added. According to this subject container condition, if the exam node state is equal to "fail," but the retake exam node state is equal to pass and student has passed all other nodes, then that subject container state will be marked as pass.

In case of optional courses, an optional courses container contains different optional subjects containers. For example, there can be a university rule for a student to get pass in at least one optional course. For this, a condition is configured inside the optional courses container, which automatically checks the optional courses node and marks the state of that container accordingly.

Moreover, a condition may be configured inside the introductory courses container which checks the state of mandatory courses container and optional courses container. If the state of both containers equal to "pass," then introductory courses is marked as fulfilled.

In some embodiments, the invention is capable of checking conditions, using the created summary nodes. For example, a summary node may be used to check if the student has fulfilled the criteria of degree completion or not. For this, conditions are configured on a summary node. A summary node inherits different fields from various nodes. For instance, a student may be required to have a total of 120 credits in order to complete his/her degree. For this, summary nodes are automatically created by the system inside introductory courses container, major and minor courses container, etc. These summary nodes contains only required fields from different nodes such as student names, their total credits for mandatory courses, etc. After the creation of summary nodes on all containers, an additional summary node is created on the curriculum management container which contains the total credits completed by the students. This summary node contains the fields such as student names (and other relevant information), and their total completed credits. Subsequently, a condition is applied on this summary node to check whether the student has completed the required number of credits. This way, creating summary nodes on containers not only makes the processing of data fast but also keeps one away from looking what is going inside every container.

In a curriculum management process, there may be a requirement to generate the curriculum of a student, not only when he/she has completed the degree requirements, but also, for a particular subject at any point in time. For this scenario, the present invention may include a signature node. In addition to some new fields, a signature node typically inherits the fields of a summary node. Additional fields may involve a field for signature of approval, etc. This signature node is not only used to generate a course specific curriculum, but can also be used as an electronic file/document for further processing. On request, the invention automatically generates an electronic file for this signature node which can be printed. Moreover, the invention is capable of generating electronic files for required nodes.

In the above described curriculum management example, there can be a scenario where a student is required to complete 60 credits for mandatory courses but he/she has completed 75 credits. In this case, an additional container is required which can hold the additional 15 credits as "extra credits" in the system. For this, a split node functionality is used. A split node is the opposite to a summary node. Here, a node containing the total credits for mandatory courses is split into two parts and are assigned accordingly to the corresponding containers. In this way, additional credits can automatically be managed by the system.

Figure 11:
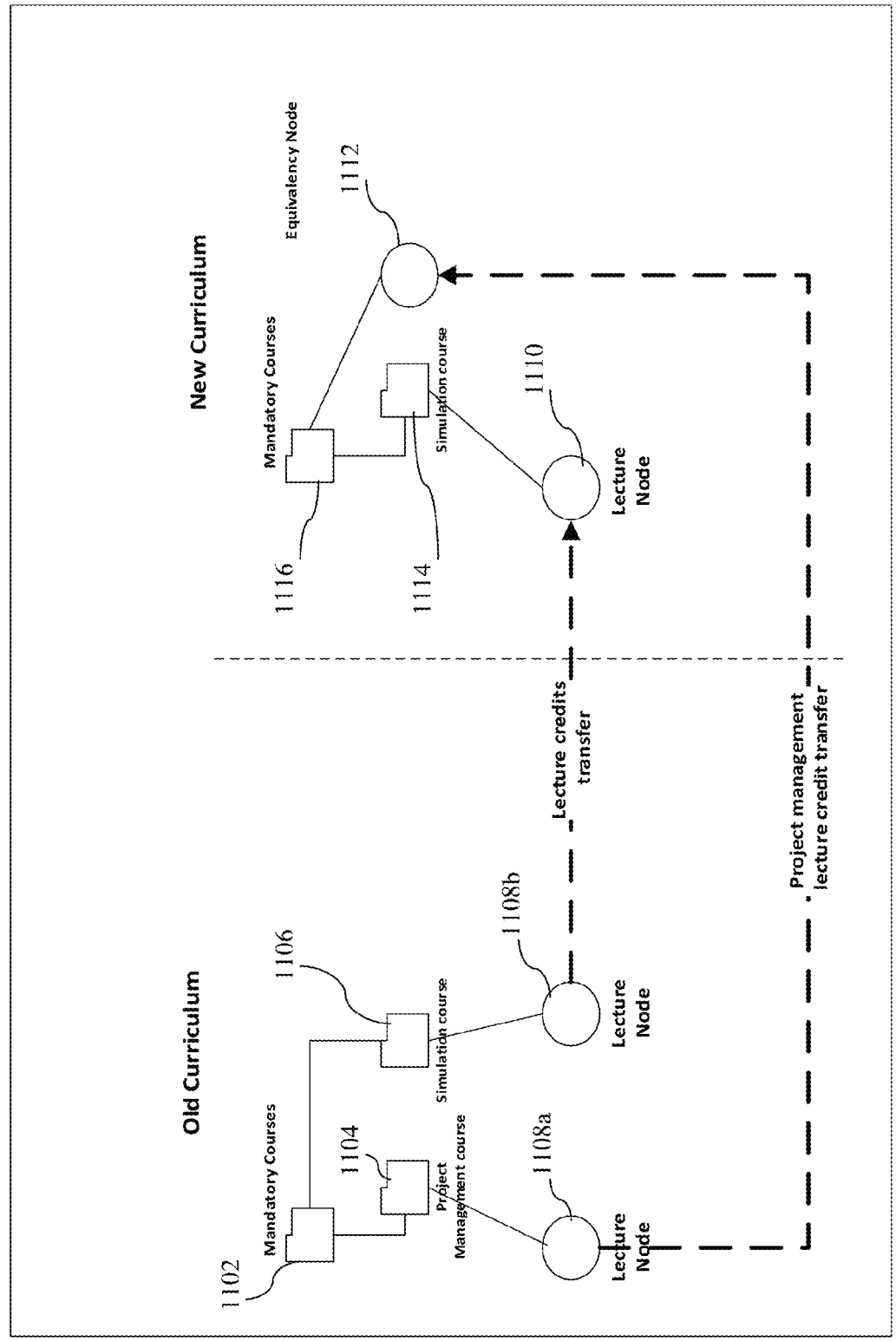
FIG. 11 shows a simplified exemplary process flow diagram for transferring credits in curriculum management application, according to some embodiments of the present invention.

FIG. 11 shows a simplified exemplary process flow diagram for transferring credits in curriculum management application, according to some embodiments of the present invention. In these embodiments, the invention facilitates the process of credit transfer from one curriculum to other. The invention helps to transfer credits using equivalency node concept. For example, a student is following curriculum 2014 (old curriculum) and university introduces a new curriculum 2015. Now, the student's previous credits need to be transferred to the new curriculum. Accordingly, credit nodes are assigned to the corresponding subject containers in the new curriculum. On the other hand, there is a possibility of having such subjects in old curriculum which do not exist in the new curriculum. Therefore, the invention allows creating equivalency nodes.

For example, suppose a student has studied a subject named project management 1104 for his mandatory course 1102, which does not exist in the new curriculum. In order to transfer the student's credits for that subject, an equivalency node 1112 is created, which is then assigned to a course container 1116 selected by the user. As a result, equivalency node creation and the flexibility to assign the node to any container help in storing and managing the curriculum. Container 1102 is configured in a way that it shows "fulfilled" (status) if both sub-containers reflect the status "fulfilled" (condition). Container 1104 is configured in a way that it shows "fulfilled" if a node 1108*a* is assigned to the container that has the status "passed." This node 1108*a* is automatically created once the student successfully attended the course/lecture "Project Management." A similar process applies to container 1106 with its course/lecture node 1108*b* to revise the curriculum and the requirements for the students. This is reflected in the new tree "New Curriculum," as shown. The new curriculum does not include the mandatory course "Project Management." Therefore no container "Project Management" is present here, however, container 1116 still requires "2 courses/lectures are passed," in order to be fulfilled.

When the curriculum is changed for a student, all existing nodes of this student are 'detached' from the tree. When the new curriculum is assigned to the student, the invention parses the student's nodes for possible "auto assignments." In this example, lecture node 1108*b* is automatically assigned to container 1114 as this container accepts nodes with the title "Simulation Course." Nodes 1108*b* and 1110 stay identical. The other course "Project Management" cannot automatically be assigned, since there is no configured target container for it. An authorized user however can use the "Project Management" node and assign it manually to the parent container 1116 (equivalence). The former node 1108*a* is now assigned to the new curriculum as node 1112. As a result, all requirements of 1116 are now fulfilled.

As illustrated above, the assignment of simulation lecture node into the new curriculum is done automatically by the invention, that is, an "auto-assignment of the node". Whereas, in case of project management credit transfer a "manual assignment of node" is performed.

In some embodiments, the invention is capable of booking or scheduling various courses being offered by using node assignments. Auto and manual assignment of a node feature can also be used by the student for course booking. For example, booking mandatory courses automatically assigns the nodes to their corresponding containers. Whereas, courses which vary from student to student may be assigned manually.

While the present invention has been particularly shown and described with reference to exemplary embodiments thereof, it will be understood by those of ordinary skill in the art that features of different embodiments may be combined to form further embodiments, and that various changes in form and details may be made therein, without departing from the scope of the present invention as illustrated by the diagrams, claims and their equivalents.

What is claimed is:

1. A method for building a software application for execution on a computer, the method comprising:

creating a plurality of data fields based on input from a user and storing said plurality of data fields in a computer memory, each data field having a value or a reference to another data field;

grouping the plurality of data fields into a plurality of node data structures, each node data structure having a list of data fields contained therein;

assigning respective node data structures of the plurality of node data structures to a plurality of container data structures in the computer memory, respectively, wherein each container data structure stores information about conditions, actions, actions results, and permission settings to operate on one or more data fields, wherein conditions for each container data structure are created based on information in the nodes of said each container data structure or other container data structures of the plurality of container data structures, and wherein each condition triggers an action when it is satisfied;

creating one or more tree data structures by linking the plurality of container data structures in a predetermined hierarchical manner; and linking the tree data structures in an ordered sequence to create a computer executable process for performing an application, wherein the plurality of node data structures, the plurality of container data structures, and the one or more tree data structures are created independent of any programming language.

2. The method of claim 1, wherein each container data structure provides a visualized feedback about results of a satisfied condition.

3. The method of claim 1, further comprising automatically checking conditions configured in a container data structure and presenting respective return values through the container data structure, once a node is assigned to said container data structure.

4. The method of claim 1, further comprising automatically filling empty data fields of a node data structure, after status of said node data structure is changed.

5. The method of claim 1, further comprising creating a summary node for a container data structure including values of the node data structure and container data structures nested below said container data structure.

6. The method of claim 1, wherein one or more of the node data structures each include a plurality different node state providing the status of respective node data structure in a particular container, and wherein a plurality of conditions are defined based on the values of respective node states.

7. The method of claim 1, wherein one or more of the node states are depicted as graphical icons.

8. The method of claim 1, wherein one or more of the node data structures are nested in a container data structure.

9. The method of claim 1, wherein one or more of the container data structures are nested in a tree data structures.

10. The method of claim 1, wherein one or more of the conditions are nested in a node data structure.

11. The method of claim 1, wherein the software application is for recruiting an application based on an application of the applicant.

12. The method of claim 1, wherein the software application is for curriculum management of a student.

13. The method of claim 1, wherein the software application is for payment processing of a payment made by a payer.

14. The method of claim 1, further comprising displaying a graphical user interface for accepting user's inputs.

15. The method of claim 1, wherein each node data structure further includes a node state for specifying allowable operations on its data fields and a node type for defining its structure.

16. The method of claim 1, wherein each container data structure is capable of being linked to another container data structure and capable of cascading the conditions, the actions and the permission settings.

17. The method of claim 1, wherein each tree data structure includes information about relations of container data structures and node data structures in said each tree data structure.

18. The method of claim 1, wherein each condition checks for information in the data fields of a node data structure, a status of a node data structure.

* * * * *